INVENTOR:
GERD E. KRULLS,
BY W. C. Crutcher
HIS ATTORNEY.

April 4, 1967 G. E. KRULLS 3,312,843
ELECTRICAL COLLECTOR APPARATUS
Filed Dec. 30, 1964 3 Sheets-Sheet 3

INVENTOR:
GERD E. KRULLS,
BY W. C. Crutcher
HIS ATTORNEY.

United States Patent Office 3,312,843
Patented Apr. 4, 1967

3,312,843
ELECTRICAL COLLECTOR APPARATUS
Gerd Edward Krulls, Glenville, N.Y., assignor to General Electric Company, a corporation of New York
Filed Dec. 30, 1964, Ser. No. 422,261
8 Claims. (Cl. 310—54)

ABSTRACT OF THE DISCLOSURE

Electrical collector using recirculating liquid metal to conduct electricity between rotating and stationary member in dynamoelectric machine where conductive blade projecting into liquid metal held in annular cup by centrifugal force has inclined holes to dynamically scoop up and discharge metal from and to the cup.

This invention concerns an electrical collector apparatus and, more particularly, an improved apparatus for electrically connecting a rotating member and a stationary member through a fluid medium.

In dynamoelectric machinery wherein high electrical currents must be conducted between stationary and rotating conductors, the use of conventional carbon brushes becomes less feasible since the carbon brushes are capable of passing current of only limited density. In order to increase the current density capacity of carbon brushes, the contact area between the brushes and the rotating collector rings must be increased by increasing either the diameter or the length of the collector rings. However, increasing the diameter of the collector rings produces an unwanted increase in tangential rubbing speed while the lengthening of the collector rings creates problems of rotor balance.

Fluid collectors, particularly of the liquid metal type, have been suggested as a replacement for conventional carbon brushes. One type of liquid metal collector suggested by the prior art includes the use of a stationary cup, which is partially filled with a liquid metal, and a flange member attached to the rotating shaft. The contour of the flange corresponds to the contour of the cup so that when the flange is mounted in closely spaced position within the cup, a close tolerance is maintained therebetween in order to avoid turbulence in the liquid metal so as to reduce splashing, arcing, and toxic vapors within the collector. However, when close tolerances are maintained between the rotating flange and the cup, special thrust bearings are required to provide for axial movement of the shaft which otherwise would result in contact between the cup and the rotating flange.

The prior art has also suggested the use of a rotating cup with a stationary flange projecting therein. However, the rotating cup arrangement tends to produce undesirable heat and the fluid conductivity tends to decrease since no practical means for cooling and filtering the fluid has been invented for this arrangement.

Attendant to efficient operation of a liquid metal collector is the need for a cooling and filtering circuit for continuously replacing the liquid metal within the cup so that the temperature is kept low to avoid vaporization of the liquid metal and contamination particles are substantially eliminated to avoid poor conductivity. When a system of cooling and filtering passages are employed problems of erosion, plugging and oxidation are encountered.

Accordingly, one object of this invention is to provide an improved fluid collector for dynamoelectric machinery which substantially eliminates turbulence of the collector fluid.

Another object is to provide a fluid collector for dynamoelectric machinery which eliminates the need for special thrust bearings.

Still another object is to provide a fluid collector for dynamoelectric machinery having easily replaceable components which conduct the collector fluid through a cooling and filtering circuit.

Still another object is to provide a fluid collector for dynamoelectric machinery having controlled ventilation to eliminate toxic, corrosive, or oxidizing vapors from the collector.

In carrying out this invention in one form thereof, a rotating shaft is provided with an annular member having a radially inwardly directed annular cup-portion for maintaining a quantity of electrically conductive fluid therein by centrifugal force upon rotation of the shaft. An electrically conductive blade member is fixed to the stationary structure surrounding the shaft and has a portion projecting into the cup to contact the fluid. Passages are provided in the stationary electrically conductive blade itself for conducting the fluid outwardly through a cooling and filtering circuit and back to the cup. A control valve is provided to regulate the flow of replenishing fluid from a reservoir to the cooling and filtering circuit in response to the fluid level in the cup. Seals are provided between the rotating cup and the blade and the fluid trapped in the seals is pumped to the reservoir for recycling back to the cup. A fan is affixed to the rotating shaft to eliminate toxic, corrosive, and oxidizing vapors.

For a better understanding of this invention, reference is made to the accompanying drawings in which.

Figure 1:
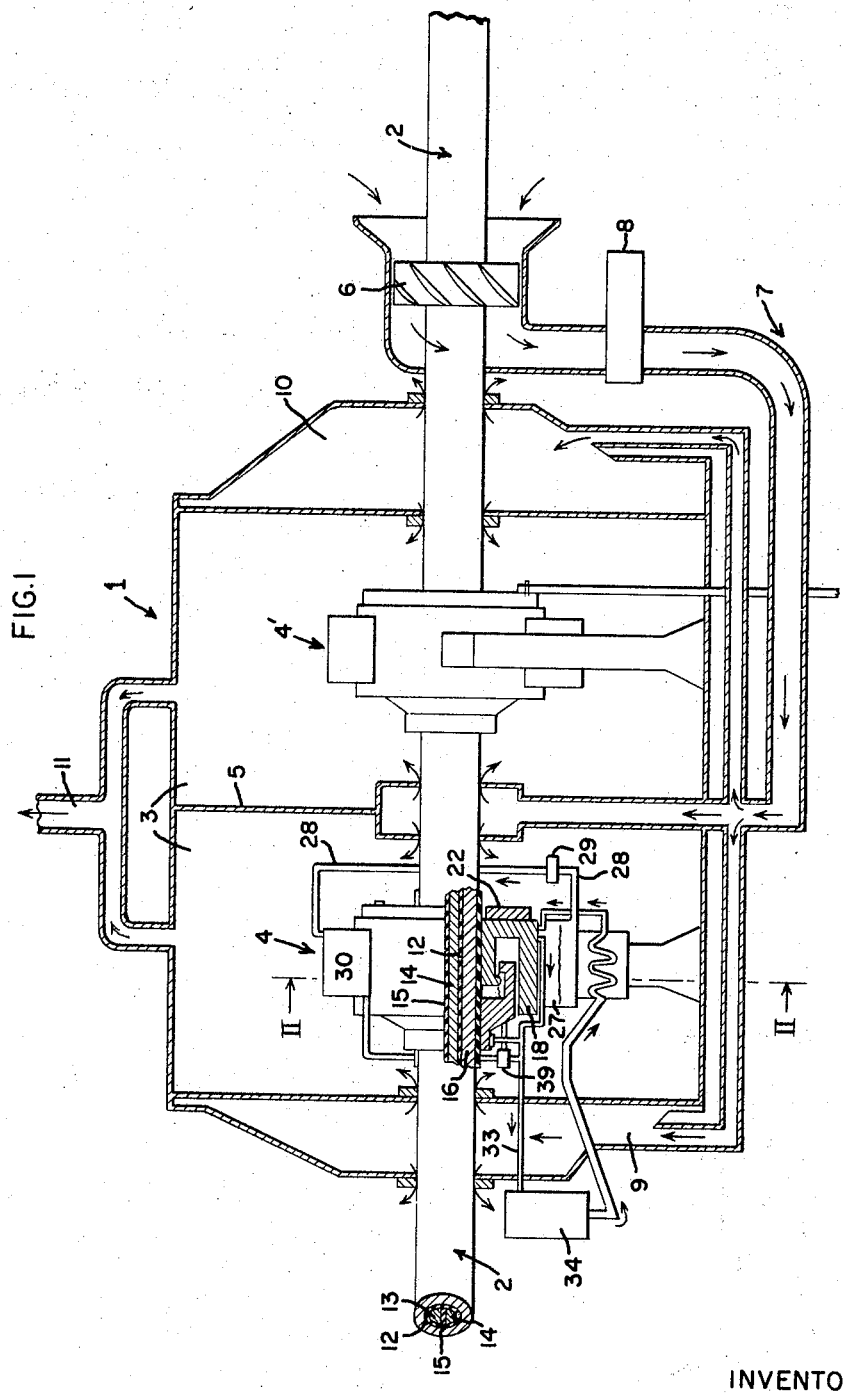
FIGURE 1 is a horizontal elevation view, partly in section, of an overall fluid collector assembly.

Referring to FIGURE 1, the overall collector assembly 1 surrounds a shaft 2 through which electrical energy is transmitted. The outer portion of the overall assembly 1 consists of a primary ventilation chamber 3 which encloses a pair of identically constructed collector elements 4 and 4', with a separator wall 5 disposed therebetween to prevent flashover. A fan 6 is mounted on one end of the shaft 2 for providing ventilation air through a conduit system 7, having a filter 8 therein, into the primary chamber 3 through the separator wall 5 and also into a pair of inlet chambers 9 and 10 at each end of the primary chamber 3. The ventilation air flows from the inlet chambers 9 and 10 along the shaft in both directions, part of the air being forced into each side of the primary chamber 3. The air entering the primary chamber 3 provides ventilation for the collector elements 4 and 4', after which the air is exhausted through exhaust conduits 11, thereby providing controlled elimination of toxic, corrosive, and oxidating vapors produced by the collectors.

Figure 2:
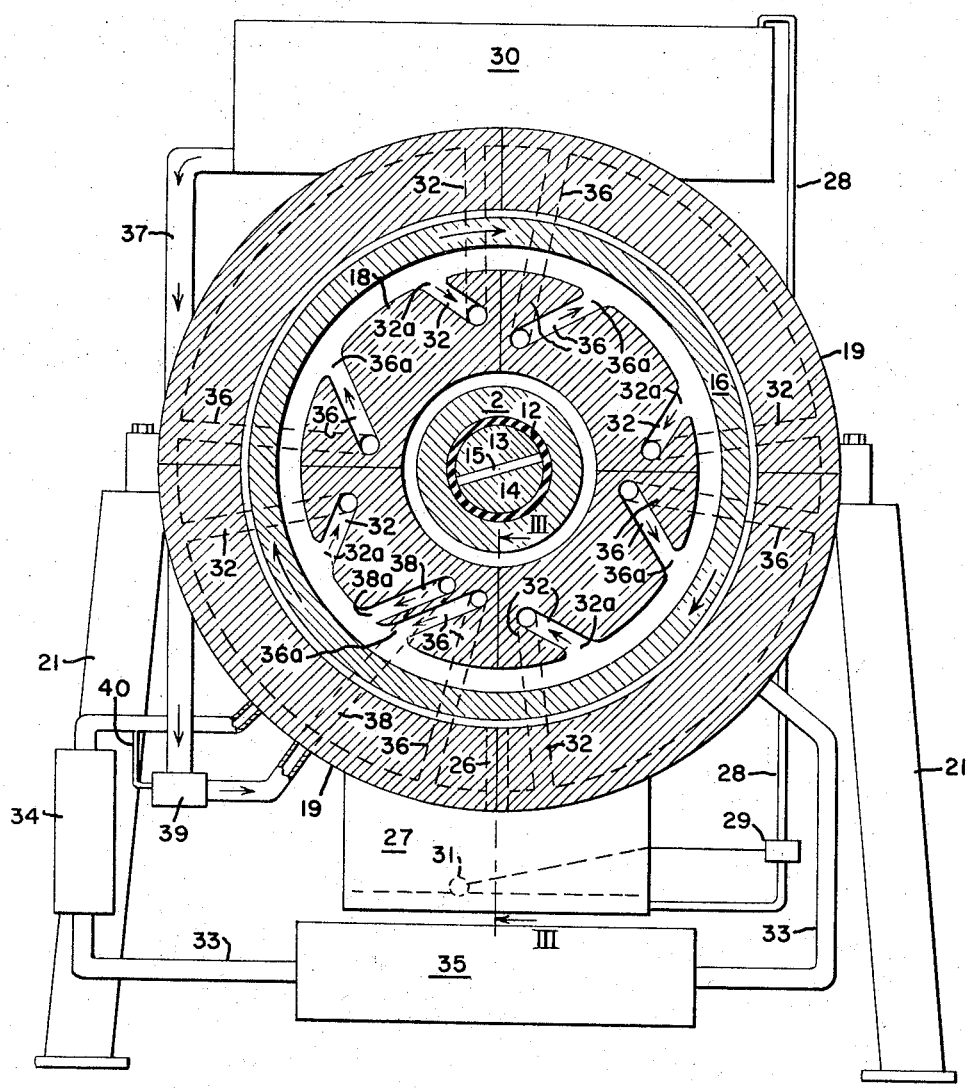
FIGURE 2 is an end view of the collector assembly, taken along lines II—II of FIGURE 1.
Figure 3:
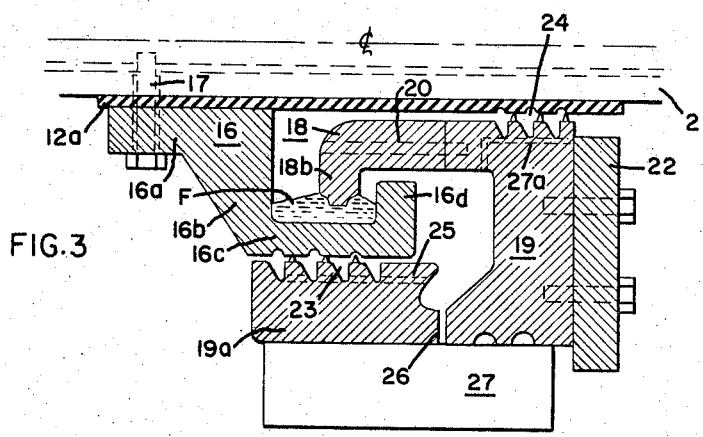
FIGURE 3 is an enlarged elevation view, in section, of the lower portion of a collector element, taken along lines III—III of FIGURE 2 showing only the drain passages within the blade member.
Figure 4:
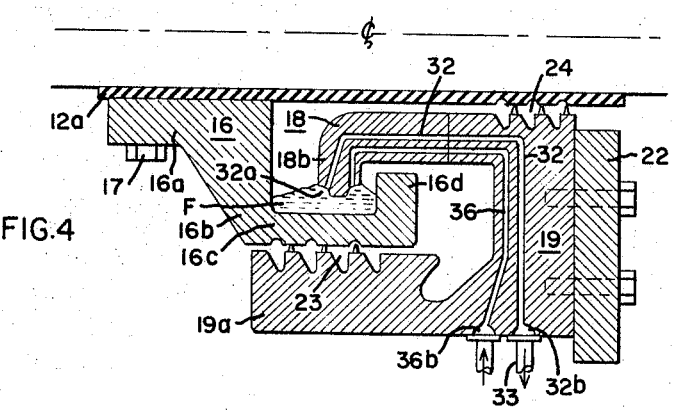
FIGURE 4 is an enlarged elevation view, in section, of the lower portion of a collector element showing only the pumping passages in the blade member.

The collector elements 4 and 4', as illustrated in FIGURES 2, 3, and 4, are identical in construction although each is arranged to conduct electricity to separate leads in the shaft 2. The shaft 2 has a hollow central portion lined with a layer of insulation 12. Within the insulated lining 12 are two leads 13 and 14 which are separated by a layer of insulation 15. Each collector element 4 and 4' has an annular cup member 16 which is secured for rotation with the shaft 2 by a shrink fit or similar joining means. A bolt member 17 projects through the layer of insulation 12 and is threaded into one of the leads 13 or 14 of the shaft for conducting electricity between one of the cups and one of the leads 13 and 14. Since the only difference between the two collector elements 4 and 4' is that the cup member 16 in each collector element is attached to separate leads within the shaft 2, only the structure of collector element 4 will be discussed hereinafter.

The annular cup 16 of the collector element 4 has a quantity of electrically conductive fluid maintained therein by centrifugal force during rotation of the shaft 2. The stationary structure includes an annular blade member 18 composed of four equal segments. Two segments are attached to each of the half-circular pole piece members 19 by screw members 20. Each of the two pole piece members 19 is bolted to the support stand 21 as indicated in FIGURE 2. The annular blade member 18 has a portion projecting into the cup for contacting the fluid therein. A bus bar 22 is connected to the pole piece 19 and conducts electricity transmitted between the stationary blade and to a power delivery cable.

The particular structure of the cup 16 and the stationary structure 18 can be better appreciated by referring to FIGURE 3. The cup 16 includes a cylindrical portion 16a which surrounds the shaft 2 and is separated therefrom by the insulating layer 12a. The bolt 17 conducts electricity to one of the leads 13 or 14 within the shaft 2 from the cup 16. A first radially directed annular cup-portion 16b is formed integrally with the cylindrical cup-portion 16a and projects radially outwardly from one end thereof. An axially directed annular cup-portion 16c is formed as an integral portion of the first radially directed cup-portion 16b at the radially outwardly end thereof. At the opposite end of the axially directed cup-portion 16c is a second radially directed annular cup-portion 16d formed integrally therewith. The second radially directed cup-portion 16d forms a lip of the cup 16 so that a quantity of electrically conductive fluid F is maintained in an annular ring within the cup by centrifugal force exerted thereon upon rotation of the shaft 2 and the cup 16.

The blade member 18, when assembled from the four segments, provides a continuous annular projection in contact with the electrically conductive fluid within the cup. A first labyrinth seal 23 is formed on the facing surfaces of the axially directed cup-portion 16c and an axially directed portion 19a of the pole piece 19. The length of the axially directed cup-portion 16c is at least four times the width of the radially inwardly directed blade-portion 18b so that axial movement of the shaft 2 and the cup member 16 does not cause contact between the blade 18 and the cup 16. Consequently substantial axial movement of the shaft 2 due to thermal expansion is not objectionable and there is no need for special thrust bearings.

A second labyrinth seal 24 is arranged on the radially inwardly directed surface of the pole piece 19 and the adjacent surface of the shaft 2. A first drain passage 25 connects the first seal 23 with a drain aperture 26 through the bottom of the pole piece 19. A second drain passage 27a connects the seal 24 with the drain aperture 26 through which the overflow and leakage fluid is conducted to a sump 27 located at the bottom of the collector element as indicated in FIGURES 2 and 3. The fluid collected in the sump 27 is pumped through a conduit 28 by a pump 29 to a reservoir 30 disposed on top of the collector element 4. The pump 29, which may be either electrically or shaft driven, is actuated by a float valve 31 as indicated in FIGURE 2 in response to the fluid level with the sump 27.

By employing a rotating annular cup and a stationary blade member, it has been found that turbulence in the conductive fluid is substantially reduced over the turbulence encountered in conventional fluid collectors in which the fluid is stationary and the blade rotates. Since the fluid is rotating relative to the blade member 18, there is a tendency of the fluid to flow radially inwardly along the surface of the stationary blade member, thus increasing the area of contact between the stationary blade 18 and the fluid F. This phenomenon is partly attributable to the reduced rotational velocity of the fluid adjacent the stationary blade 18 due to friction between the fluid and the surfaces of the blade. The reduced rotational velocity of the fluid adjacent the stationary blade reduces the outwardly directed centrifugal force on an equal mass of fluid in that area. Hence, in order to balance the fluid pressure at all points in the pool within the cup, a greater mass of fluid in the radial plane adjacent the surfaces of the stationary blade member is required. The increased mass of fluid adjacent the stationary blade results in the increased contact between the fluid and the stationary blade.

During operation of the fluid collector, the temperature of the fluid tends to rise. Also, foreign particles may find their way into the fluid and, thereby, reduce the conductivity. To overcome these difficulties, pumping grooves are arranged in the electrically conductive stationary blade 18, as illustrated in FIGURES 2 and 4 for circulating the fluid through a filtering and cooling cycle. The pumping grooves include an outlet passage 32 in each of the four blade segments. Each of the outlet passages 32 is directed radially inwardly and tangentially in the direction of rotation of the fluid F relative to the stationary blade member 18. The outlet apertures 32a of the outlet passages 32 are submerged in the fluid F so that rotational momentum of the fluid forces a portion of the fluid to flow radially inwardly through the outlet passages 32 in the blade 18 and the pole piece 19 to a common outlet manifold 32b. The outlet manifold 32b is formed by a groove in the circumferential surface of the pole piece 20. The groove is covered with a welded plate to form the closed manifold 32b. The fluid is conducted from the outlet manifold 32b through a conduit 33. The conduit 33 conducts the fluid through the walls of the primary ventilation chamber 3 to a replaceable filter 34 disposed on the outside of the overall collector assembly as illustrated in FIGURE 1. From the filter 34 the fluid is conducted by the conduit 33 to a cooler 35 positioned below the sump 27 and within the primary chamber 3. The conduit 33 then conducts the fluid to inlet passages 36 in the pole piece and in each blade segment, as illustrated in FIGURES 2 and 4. The flow is divided into each of the inlet passages 26 by an inlet manifold 36b, which consists of a groove in the circumferential surface of the pole piece 19. The inlet passages are arranged in the blade segments and are oriented to direct the fluid radially outwardly and tangentially in the direction of rotation of the fluid relative to the blade member 18 as illustrated in FIGURE 2. The speed of the fluid past the inlet apertures 36a tends to draw the fluid within the inlet passage 36 outwardly into the fluid stream. Hence, the fluid is transmitted through the filtering and cooling apparatus by a positive pumping action into the outlet passages, and a Bernoulli-type suction created by the fluid flowing past the inlet aperture 36a of the inlet passages 36 draws the fluid therefrom and into the cup.

Figure 5:
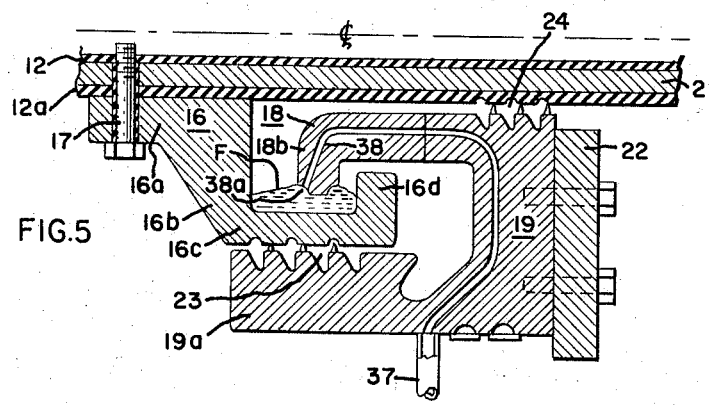
FIGURE 5 is an enlarged elevation view, in section, of the lower portion of a collector element showing only the refill passages.

In order to insure continual contact between the blade 18 and the electrically conductive fluid F, the fluid is maintained at a preset depth in the cup 16 by regulating the gravity flow of fluid from the reservoir 30 through a conduit 37, through a refill passage 38 in the lower half of the pole piece 19 and the blade 18, and radially outwardly into the cup through a refill aperture 38a in the submerged portion of the blade 18, as illustrated in FIGURES 2 and 5. A control valve 39 is positioned in the conduit 37 below the reservoir 30 and is operated by a pressure signal transmitted through a pressure passage 40 which communicates with the portion of the conduit 33 between the outlet manifold 32b and the filter 34, as illustrated in FIGURE 2.

During shut down, the fluid pressure within the conduit 33 decreases, thus causing the control valve 39 to open. The fluid drains from the resrvoir 30 into the cup through the inlet passages 36. The fluid overflows from the cup 16 and is subsequently drained into the sump 27 through the drain aperture 26. The sump pump 29 is no longer operating, so the fluid remains in the sump 27.

Operation of the fluid collector apparatus begins by actuating the sump pump 29, thereby pumping the fluid to the reservoir 30. The pressure in the cup is at the atmospheric level, so the control valve 39 remains open and, hence, the fluid flows through the conduit 37, through the refill passage 38 and into the cup 16 by gravity flow. Start-up rotation of the shaft causes the fluid to be centrifugally forced along the bottom surface of the cup to form an annular ring in contact with both the cup 16 and the blade 18, thereby enabling the passage of electrical current between the stationary structure and the leads within the rotating shaft. As the cup and fluid begin to rotate relative to the blade, the fluid is pumped through the outlet passages 32, through the filter 34 and cooler 35, and back through the inlet passages 36 to the cup. Additional fluid is continuously introduced into the system through gravity flow from the reservoir 30 until the fluid level in the cup increases to the desired level, and the corresponding increase in fluid pressure in the conduit 33 causes the control valve 39 to close and no additional fluid enters the system.

During rotation of the shaft, fan 6 rotates and forces ventilation fluid through the inlet and primary ventilation chambers to effect controlled discharge of harmful fumes. The system continues to operate through the pumping, filtering, cooling, and return cycle. When sufficient fluid is lost from the cup and the fluid level in the cup drops below a minimum level, the corresponding pressure drop of the fluid in the conduit 33 actuates the control valve 39 to the open position and additional fluid is introduced back into the system by gravity flow from the reservoir. The fluid lost from the cup is trapped in the seals 23 and 24 and is returned via the drain aperture 26 to the sump 27 from which it is pumped back to the reservoir in response to actuation of the sump pump 29 which is, in turn, regulated by the float valve 31 in the sump.

From the foregoing discussion it will be apparent that the fluid collector apparatus provides efficient transmission of electrical energy between a stationary current source and the conductors in a rotating shaft. The electrically conductive fluid is maintained substantially contamination-free and cooled while the toxic, corrosive, and oxidizing vapors are exhausted therefrom in a controlled manner. Also, turbulence is greatly reduced by employing a rotating cup with fluid therein, thereby enabling use of a larger cup and a relatively smaller width blade to obviate the necessity of special thrust bearings.

While a specific embodiment of this invention has been shown and described, it is not intended that the invention be limited to the particular structure and it is intended by the appended claims to cover all modifications within the spirit and scope of this invention.

What I claim as new and desire to secure by Letters Patent of the United States is:

1. An improved electrical collector apparatus for electrically connecting a rotating and a stationary member comprising:
    (a) an electrically conductive annular cup connected to the rotating member and defining an annular opening directed radially inwardly toward a horizontal axis of rotation,
    (b) a quantity of electrically conductive fluid held in said cup by centrifugal force and substantially rotating therewith,
    (c) an electrically conductive blade attached to the stationary member and having a portion extending radially outwardly into the liquid through said annular opening,
    (d) said blade portion defining fluid inlet and fluid outlet openings within said annular opening inclined from a radial direction so as to receive and discharge the electrically conductive fluid due to relative motion of said fluid in said cup past said openings when said cup is rotating, and
    (e) circulating conduit means connected to conduct recirculated fluid between said inlet and said outlet opening in said blade portion through an external system for treating said fluid.

2. An improved electrical collector apparatus as recited in claim 1 wherein said stationary member includes:
    (a) an annular pole piece surrounding the rotating member,
    (b) first sealing means on a first annular surface of said pole piece adjacent the radially outer surface of said cup member,
    (c) second sealing means on a second annular surface of said pole piece adjacent the surface of said rotating member, and
    (d) drain passages in said pole piece for conducting fluid splashed from said cup and fluid trapped in said first and second sealing means to a sump.

3. An improved electrical collector apparatus as recited in claim 2 including means for refilling said cup to replace fluid losses therefrom comprising:
    (a) a fluid reservoir disposed above said collector apparatus,
    (b) a first conduit connecting said sump and said reservoir, and a pump for forcing fluid from said sump to said reservoir, said pump being actuated in response to increase fluid level in said sump,
    (c) a refill passage in said blade and said pole piece, said refill passage having an inlet opening through the outer wall of said pole piece and an opening through the blade portion projecting into said cup, and
    (d) a second conduit connecting said reservoir and said refill passage, said second conduit including a valve for controlling the gravity flow of fluid from said reservoir to said cup.

4. An improved electrical collector apparatus as recited in claim 3 wherein said refill control valve in said second conduit for controlling the flow of fluid from said reservoir through said refill passages and into said cup includes a pressure conducting passage connecting said valve with said circulating conduit means to provide a pressure signal in response to the amount of fluid in said circulating conduit for actuating said refill control valve so that said valve is opened when the amount of fluid decreases below a selected minimum amount of fluid in said cup and said circulating conduit, and said valve closes when the amount of fluid increases above a selected maximum amount of fluid in said cup and said circulating conduit.

5. An improved electrical collector apparatus as recited in claim 1 wherein said external system for treating said fluid includes a filter and a cooler.

6. An improved electrical collector apparatus as recited in claim 1 wherein said fluid inlet and outlet openings and conduit means in said blade portions comprise:
    (a) an outlet passage in said blade portion, said outlet passage being connected to said outlet opening through said blade portion projecting into said fluid, said outlet passage being radially inclined in said blade portion in the direction of rotation of said fluid in said rotating cup so that the momentum of fluid passing through said outlet opening is maintained in said outlet passage.
    (b) an inlet passage in said blade portion, said inlet passage being connected to said inlet opening through said blade portion projecting into said fluid, said inlet passage being radially inclined in said blade portion opposite to the direction of rotation of said fluid in said rotating cup so that the movement of said fluid past said inlet opening tends to draw fluid from said inlet passage into said cup.

7. An improved electrical collector apparatus as recited in claim 6 including:
    (a) a first covered manifold groove around the outer peripheral surface of said pole piece for connecting each of said outlet passages with the inlet end of said circulating conduit means, and
(b) a second covered manifold groove around the outer peripheral surface of said pole piece for connecting each of said inlet passages with the outlet end of said circulating conduit means.

8. An improved electrical collector apparatus as recited in claim 1 including means for ventilating the electrical collector apparatus comprising:
(a) a primary chamber surrounding said apparatus, said primary chamber having at least one aperture through which said rotating member projects,
(b) at least one inlet chamber surrounding said rotating member and positioned adjacent said aperture in said primary chamber for conducting air to said primary chamber through said aperture and along said rotating member,
(c) a fan mounted for rotation with said rotating member, said fan being connected to said inlet chamber by a conduit, and
(d) an exhaust conduit leading from said primary chamber for providing controlled exhaust of ventilation air forced through said primary chamber by said fan.

References Cited by the Examiner
UNITED STATES PATENTS

| | | | |
|---|---|---|---|
| 970,407 | 9/1910 | Von Ugrimoff | 310—178 |
| 1,271,438 | 7/1918 | Cook | 310—219 X |
| 1,507,825 | 9/1924 | Gill et al. | 310—178 |
| 1,635,319 | 7/1927 | Gill et al. | 310—178 |
| 2,753,476 | 7/1956 | Watt | 310—178 |
| 3,191,082 | 6/1965 | Csillag | 310—219 |
| 3,211,936 | 10/1965 | Harvey | 310—219 X |

References Cited by the Applicant
UNITED STATES PATENTS

| | | |
|---|---|---|
| 2,828,431 | 3/1958 | Klaudy. |
| 2,845,554 | 7/1958 | Schwab. |

MILTON O. HIRSHFIELD, *Primary Examiner.*

D. F. DUGGAN, *Assistant Examiner.*